United States Patent [19]

Hultman

[11] Patent Number: 4,787,823

[45] Date of Patent: Nov. 29, 1988

[54] ELECTROMAGNETIC LINEAR MOTOR AND PUMP APPARATUS

[76] Inventor: Barry W. Hultman, P.O. Box 1864, Bristol, Conn. 06010

[21] Appl. No.: 946,372

[22] Filed: Dec. 24, 1986

Related U.S. Application Data

[63] Continuation-in-part of Ser. No. 736,837, May 22, 1985, abandoned.

[51] Int. Cl.$^4$ ............................................. F04B 17/04
[52] U.S. Cl. ..................................... 417/45; 417/259; 417/417; 417/418; 310/27
[58] Field of Search ............... 417/259, 417, 418, 416, 417/44, 45; 310/27; 318/127, 128, 132

[56] References Cited

U.S. PATENT DOCUMENTS

| | | | |
|---|---|---|---|
| 4,150,922 | 4/1979 | Cuenaud et al. | 417/45 |
| 4,421,464 | 12/1983 | Schmidt et al. | 417/417 |
| 4,518,317 | 5/1985 | Inoue | 417/417 |

FOREIGN PATENT DOCUMENTS

5553264  11/1981  Japan ................................... 417/417

Primary Examiner—Carlton R. Croyle
Assistant Examiner—Ted Olds
Attorney, Agent, or Firm—McCormick, Paulding & Huber

[57] ABSTRACT

An electromagnetic linear motor having a variable length stroke and providing a substantially large force in both its power stroke and return stroke includes concentric inner and outer magnetic circuits arranged coaxially for movement relative to one another in a rectilinear path with reciprocating motion in response to the interaction of magnetic fields produced by the inner and outer magnetic circuits, respectively. The length of the stroke and the rate of reciprocation are directly proportional to the magnitude of the voltage used to excite primary and secondary coils which generate the respective magnetic fields and the rate at which the polarity of the voltage applied to the secondary coil is changed between negative and positive polarities. The invention further resides in a central core pump having a pumping tube connected for movement with the outer magnetic circuit and in coaxially alignment with inlet and discharge tubes and each of the three tubes having a check valve to form variable volume chambers between the pumping and inlet and pumping and outlet tubes respectively so that one or more successive volumes of fluid are drawn into one and discharged from the other when the outer circuit moves in one direction and discharged from one and drawn into the other when the outer circuit moves in the opposite direction. The invention further resides in the electromagnetic linear motor being arranged with a central core pump to provide fuel injection to an internal combustion engine.

10 Claims, 5 Drawing Sheets

ELECTROMAGNETIC LINEAR MOTOR AND PUMP APPARATUS

This is a Continuation-In-Part application of my application Ser. No. 736,837, filed May 22, 1985 now abandoned.

BACKGROUND OF THE INVENTION

This invention relates generally to electromagnetic linear motors and deals more specifically with an electromagnetic linear motor having a variable length stroke and providing a substantially large force with both its power stroke and its return stroke.

It is desirable in many instances to utilize a linear motor because it is readily adaptable for integration into the apparatus it is driving to save space.

Another advantage of a linear motor compared to a rotational motor is the elimination of additional mechanisms and apparatus such as, for example, a crankshaft and connecting rod which are normally required to transform rotational motion to linear motion.

It is known to provide an electromagnetic linear motion motor based on the principle of generating a linear force by the interaction of two magnetic fields to cause relative movement between magnetic members. Generally, one of the magnetic fields is produced by one magnetic member such as, a permanent magnet which is generally held stationary relative to another magnetic member such as, an electric coil assembly in which undirectional (DC) current flows to produce the other magnetic field and which assembly is moveable relative to the permanent magnet. The force produced by such an electromagnetic motor is directly proportional to the product of the magnetic flux density produced by the permanent magnet and the magnitude of the current carried by the moving electric coil. Since the magnetic flux density is produced by an unidirectional current, it is of a substantially constant value and the direction of movement and accordingly, force is determined by the directional sense or polarity of the DC current flowing in the electrical coil.

One drawback generally associated with an electromagnetic linear motor of the aforedescribed type is the magnetic flux density produced by a permanent magnet is not of sufficient magnitude to cause an appreciable force and movement of any substantial displacement by the coil assembly relative to the stationary permanent magnet unless the magnet is very large and thus substantially increasing the size of the motor. Consequently, a linear motor using a magnet to produce flux density is in practice, limited to applications wherein a relatively short stroke and small force are required.

Known linear motors that operate on the principal of interactive magnetic fields generally have a short stroke and produce a low force and are unsatisfactory for fluid pumping applications wherein it is required to pump a large volume of fluid at a high rate and/or at a relatively high pressure.

A number of fluid pump apparatus and linear motors have been disclosed wherein the electromagnetic linear motor has a moving coil assembly that generally operates with a large force in one direction of movement only and usually requires a biasing means, such as a spring, to return the moving assembly to its initial starting position from its operated position.

An example of a linear motor and fluid pump apparatus is disclosed in U.S. Pat. No. 2,495,598 to Parker wherein an electromagnet attracts a piston to compress a spring wherein at the end of the stroke the spring returns the piston to its idle position.

Another linear motor and fluid pump apparatus is disclosed in U.S. Pat. No. 2,768,580 to Parker wherein an electromagnet operates to attract a piston to compress a spring and a permanent magnet senses the proximity of the piston during the compression stroke and causes a movable electrical contact to pivot away from a fixed electrical contact to deenergize the electromagnet to permit the spring to return the piston to its normal position. The output of the pump is increased by increasing the compression of the spring through a mechanical adjustment.

All of the known electromagnetic linear motor and fluid pump apparatus have one or more limitations that make them unsuitable for fluid pumping applications.

One limitation generally associated with electromagnetic linear motors of the above-described type that operate by compressing a spring to provide the return stroke or the power stroke require a relatively large spring to generate any appreciable pressure or to pump a large volume of fluid per stroke.

Another limitation generally associated with electromagnetic linear motors and fluid pump apparatus utilizing compression springs is the frequency or repetition rate at which such devices are capable of operating are at relatively low frequencies. When it is desired to operate at a high repetition rate, the spring needed for the return stroke becomes very large and consequently the force needed to compress the spring becomes much greater resulting in slower overall final pressure provided by an associated pump.

A further limitation generally associated with electromagnetic linear motors and fluid pump apparatus in general, is the inability to provide a variable length stroke from stroke-to-stroke and accordingly, to pump a variable volume of fluid from stroke-to-stroke.

It would be desirable, therefore, to provide an electromagnetic linear motor that has a long stroke and a substantially large force in both the power stroke and return stroke that overcomes many of the drawbacks associated with prior electromagnetic linear motor motors.

It is a general object of the present invention therefore, to provide an electromagnetic linear motor that operates on the principal of interactive magnetic fields to move an armature with a reciprocating motion over a relatively large displacement and with a substantially large force in both directions of movement.

It is another object of the present invention to provide an electromagnetic linear motor that is controllable and operates with a variable length stroke.

It is a further object of the present invention to provide an electromagnetic linear motor and an associated central core fluid pump that pumps a variable volume of fluid.

It is a yet further object of the present invention to provide an electromagnetic linear motor and an associated central core fluid pump that operates over a large frequency range.

It is a still further object of the present invention to provide an electromagnetic linear motor and associated central core fluid pump that is usable as a fuel injector for an internal combustion engine.

Other objects and advantages of the invention will be apparent from the following detailed description and from the accompanying drawings forming a part thereof.

SUMMARY OF THE INVENTION

In accordance with the present invention, an electromagnetic linear motor having a variable length stroke and providing a substantially large force in both its power stroke and return stroke is present. The electromagnetic linear motor includes a magnetic structure that has concentric inner and outer magnetic circuits which move relative to one another in a rectilinear path with a reciprocating motion. The inner magnetic circuit includes an elongated cylindrical core which has a diametrically enlarged portion at one end and is supported at its other end by a bottom plate. An outer, concentric shell forms an air gap with the enlarged portion and the shell is supported at one end by the bottom plate. A conductor is wound on the core to form a first electrical coil to produce a first magnetic field across the air gap in response to a first-applied electric signal. The outer magnetic circuit includes a shuttle assembly or armature which is coaxially arranged between the core and shell for rectilinear motion through the air gap. A conductor is wound on the shuttle to form a second electrical coil to produce a second magnetic field in response to a second-applied electrical signal. The shuttle moves with a reciprocating motion through the air gap in response to the interaction of the first and second magnetic fields.

The invention further resides in an electromagnetic linear motor being arranged with a central core fluid pump wherein the cylindrical core has an axial bore forming a first tube which is in registry with a central opening in the bottom plate. The shuttle has a support plate at one end which has an axial central opening. A second tube is fixedly mounted in the central opening of the plate for movement with the plate and extends some distance on opposite sides of the plate. A third tube is fixedly connected to the inner magnetic circuit concentric shell in coaxial alignment with the first and second tubes so that the second tube moves coaxially within the first and third tubes. Sealing means are located near the respective ends of the second tube and form a seal between the second tube and the first and third tubes, respectively. Each of the tubes has a check valve to form a first variable volume chamber in the first and second tubes and a second variable volume chamber in the second and third tubes so that successive volumes of fluid are drawn into the first chamber and discharged from the second chamber when the shuttle moves in one direction and to draw fluid from the first chamber into the second chamber when the shuttle moves in the other direction, respectively whereby continuous reciprocating motion of the shuttle causes successive volumes of fluid to be drawn into and expelled from the pump.

The invention still further resides in varying the stroke length of the electromagnetic linear motor arranged with a central core fluid pump to provide a desired volume of fluid wherein a given volume of fluid pumped is directly related to the stroke length and the change in volume of the variable volume chamber as the shuttle moves to decrease the size of the chamber.

DETAILED DESCRIPTION OF THE PREFERRED EMBODIMENT

Figure 3:
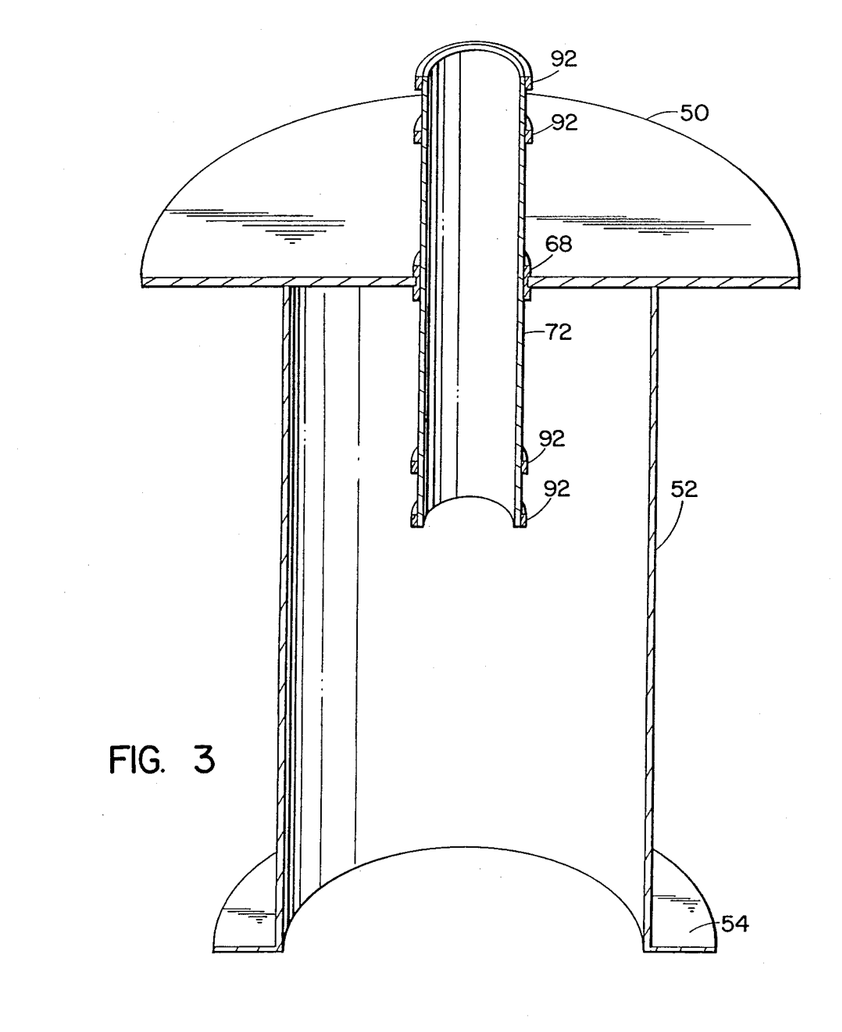
FIG. 3 is a sectional view of the secondary magnetic field coil bobbin and pumping tube assembly of the linear motor and fluid pump apparatus of FIG. 1 shown without the pumping tube one-way directional flow valve.
Figure 4:
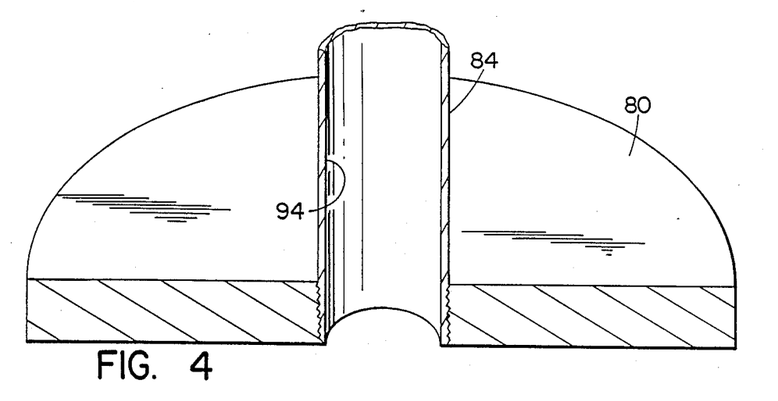
FIG. 4 is a sectional view of the outer plate and discharge tube assembly of the linear motor and fluid pump apparatus of FIG. 1 shown without the upper discharge one-way directional flow valve.
Figure 5:
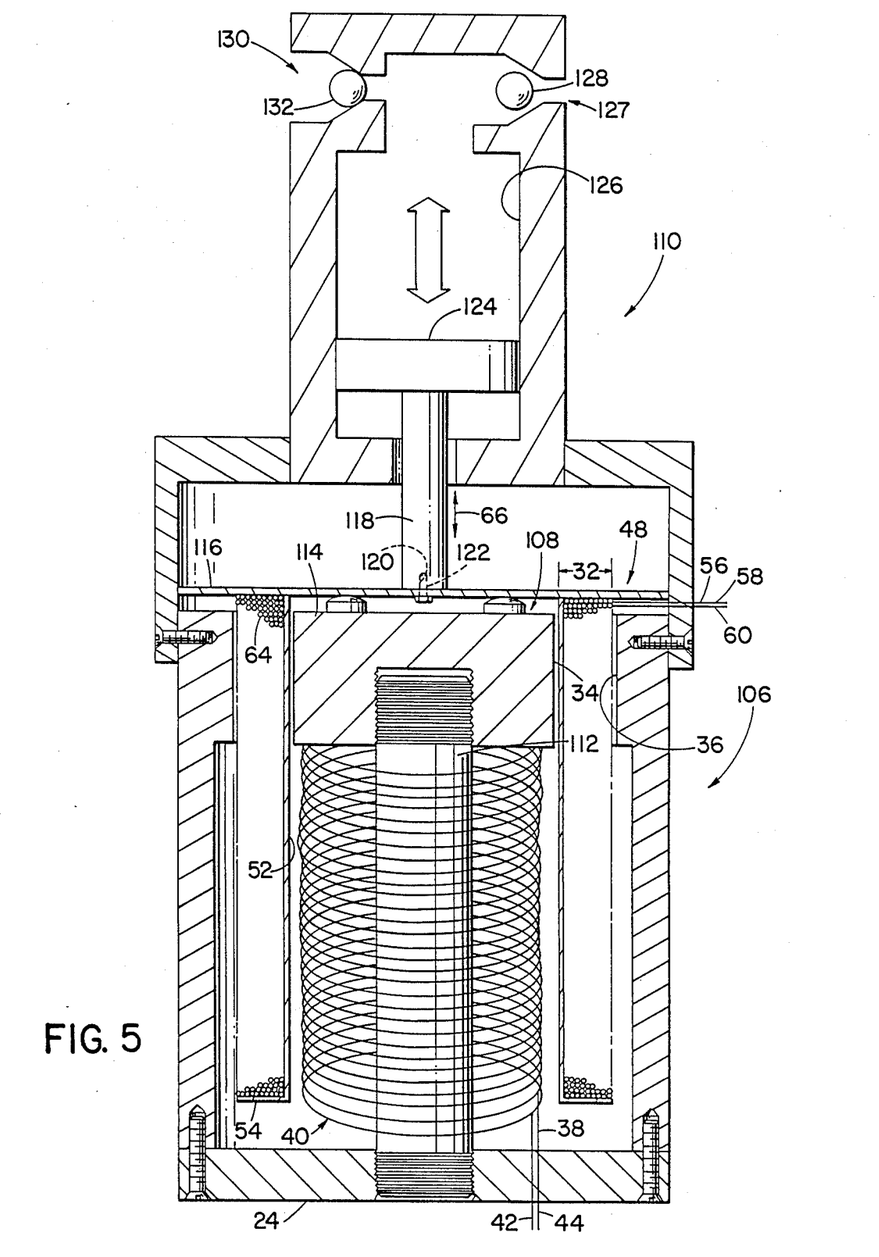
FIG. 5 is a sectional view of another embodiment of the electromagnetic linear motor of the present invention arranged to drive a reciprocating pump.
Figure 6:
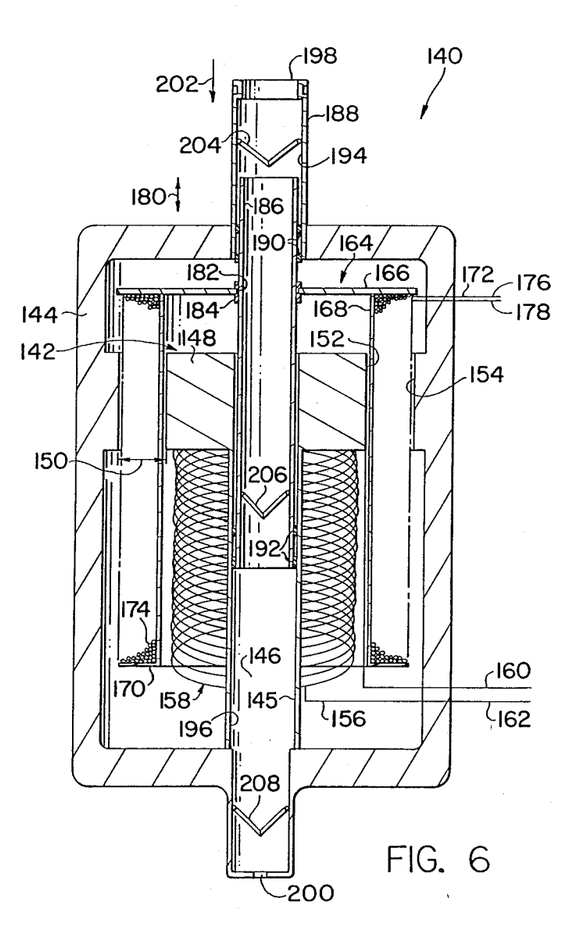
FIG. 6 is a cross-sectional view of the electromagnetic linear motor embodying the present invention arranged as a fuel injection device.
Figure 7:
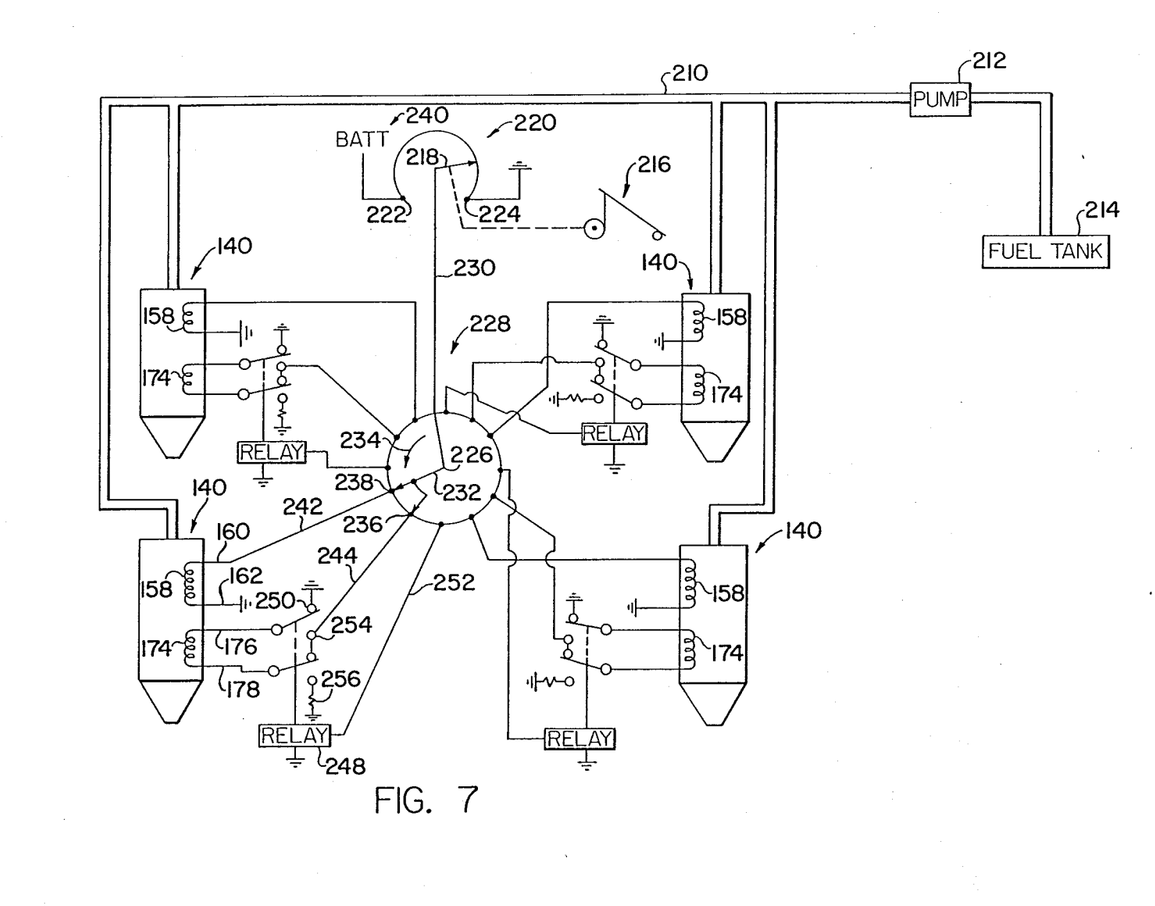
FIG. 7 illustrates somewhat schematically a number of the fuel injectors of FIG. 6 in a typical arrangement for providing fuel to an engine wherein a distributor is used to excite the injectors.

Considering now the invention in further detail and referring to FIGS. 1 through 7, an electromagnetic linear motor generally designated 10 embodying the present invention is shown. FIGS. 1 through 4 illustrate the electromagnetic linear motor arranged with a central core fluid pump. FIG. 5 illustrates the electromagnetic linear motor coupled to a reciprocating piston pump. FIGS. 6 and 7 illustrate the electromagnetic linear motor arranged with a central core fluid pump adapted for use as a fuel injector. The electromagnetic motor 10, in the illustrated embodiment, is generally cylindrical in configuration; however, other configurations such as polygonal, or rectangular may be used.

Considering first FIGS. 1 through 4, the electromagnetic motor 10 includes an inner magnetic circuit comprised of a primary magnetic field coil central core assembly designated generally 12 and an outer concentric shell 30. The inner magnetic circuit core assembly 12 and shell 30 are made of a magnetic material, such as, for example, cold rolled steel. The core assembly 12 includes an axially elongated core 14 that has an axial bore extending lengthwise through the core and designated generally 16. One end of the core assembly 12 includes a generally cylindrical, diametrically enlarged portion 18 coupled to the core 14. In the illustrated embodiment, the enlarged portion 18 has an axially threaded central opening 20 to receive the threaded end of the core 14. The opening 20 has an inner diameter and wall length so as to form a continuous, smooth transition along the inner wall 22 of the upper portion of the assembly 12 when the core 14 is screwed into the opening.

Figure 1:
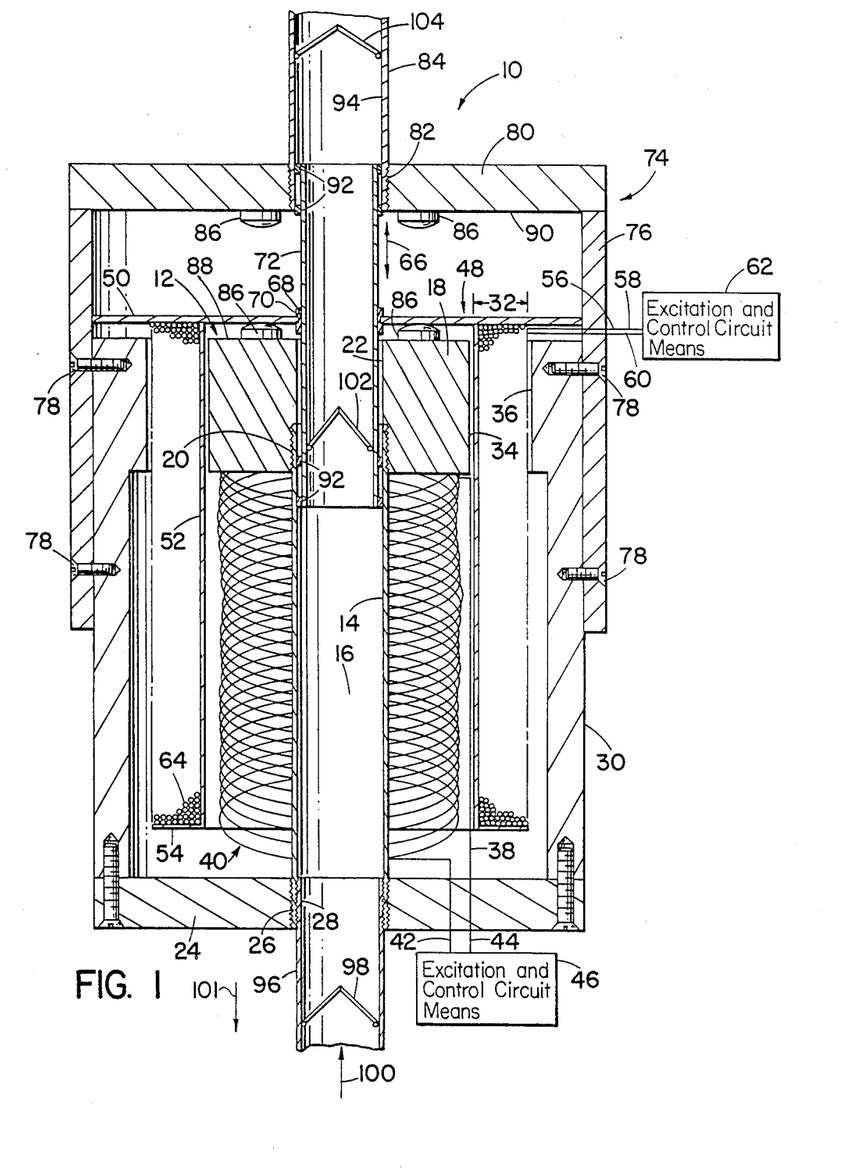
FIG. 1 is a sectional view of an electromagnetic linear motor embodying the present invention arranged with a central core fluid pump apparatus.
Figure 2:
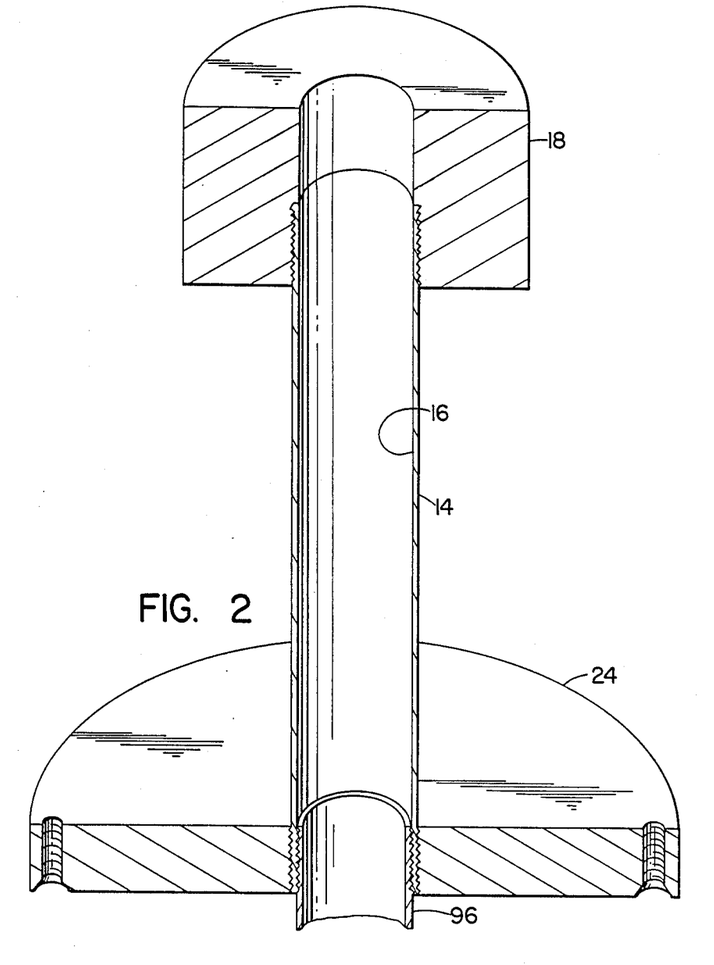
FIG. 2 is a sectional view of the primary magnetic field coil, central core and inlet tube assembly of the linear motor and fluid pump apparatus of FIG. 1 shown without the inlet tube one-way directional flow valve.

The core assembly 12 also includes a bottom plate 24 coupled to the opposite end of the core 14. The bottom plate 24 has a threaded central opening 26 to receive and support the threaded opposite end of the core 14. The outer concentric shell 30 is connected to and supported by the plate 24 at the lower end of the wall. The shell 30 surrounds the core assembly 12 and forms an annular air gap 32 between the outer surface 34 of the enlarged portion 18 and the inner surface 36 of the upper part of the shell 30.

The core assembly 12 includes a conductor 38 wound around the core 14 to form an electromagnetic coil 40. The coil 40 produces a magnetic field across the air gap 32 in response to an electrical signal potential applied across the ends 42,44 of the conductor 38. The ends 42,44 are connected to a primary excitation and control circuit means indicated generally by the function block 46. The electromagnetic primary coil 40, when excited by an electric signal from the primary excitation and control circuit 46, produces a magnetic field across the air gap 32. The magentic field produced by the excited coil 40 has a substantially greater magnetic flux density than a corresponding magnetic field produced by a permanent magnet core.

A secondary magnetic field coil bobbin assembly generally designated 48 is mounted coaxially with the core assembly 12 and is arranged for axial movement relative to the inner magnetic circuit. The bobbin assembly 48 includes an upper support plate 50, a bobbin wall 52 and a lower support plate 54. The plate 50, wall 52 and lower support plate 54 collectively comprise a spool around which a conductor 56 is wound to form a secondary electromagnetic coil 64.

The axial length of the secondary coil 64 is longer than the axial length of the diametrically enlarged portion 18 and preferably, is at least twice as long. The electromagnetic coil 64 produces a second magnetic field in response to an electric signal potential applied across the ends 58,60, respectively of the conductor 56. The ends 58,60 are connected to a secondary excitation and control circuit means designated generally by the function block 62. The electromagnetic secondary coil 64, when excited by an electric signal from the secondary excitation and control circuit 62, produces a second magnetic field which interacts with the first magnetic field across the air gap 32 to cause the bobbin assembly 48 to move axially in a direction illustrated by the arrow 66.

The electromagnetic motor operates as follows. An electric DC current of the proper magnitude and electrical polarity is supplied to the primary coil 40 by the primary excitation and control circuit 46. The primary coil 40 produces a magnetic field across the air gap 32 in response to the applied electric signal. A second electric signal potential of the proper magnitude and electrical polarity is supplied to the secondary coil 64 by the secondary excitation and control circuit 62. The secondary coil 64 produces in response to the applied electric signal a second magnetic field. The second magnetic field interacts with the first magnetic field to propel the bobbin assembly 48 and accordingly, the secondary coil 64 would around it in the direction of arrow 66 due to the DC current flowing in the secondary coil cutting the lines of flux produced in the air gap 32 by the excitation of the primary coil 40. The bobbin assembly 48 will continue to move until it is completely out of the air gap 32 unless it is mechanically stopped or until the second electric signal potential applied to the secondary coil 64 is removed which causes the magnetic field to collapse. Alternately the movement of the bobbin assembly 48 can be stopped by reversing the polarity of the second electric signal to cause the current flowing in the secondary coil 64 to flow in the opposite direction. The flow of current in the opposite direction cuts the lines of flux produced by the excitation of the primary coil 40 and according to the right hand rule produces a force to cause the bobbin assembly 48 to move in the opposite direction. It is preferable to stop or change the direction of travel of the bobbin assembly 48 by reversing polarity of the second electric signal potential rather than removing the second electric signal to cause the bobbin assembly to move in a direction opposite to its first travel direction to regulate and control the distance the bobbin travels.

It will be seen that successive polarity reversals of the second electric signal to the coil 64 in the presence of the magnetic field provided by the excitation of the primary coil 64 causes the bobbin assembly 48 to shuttle back and forth. It will also be seen that the rate at which the polarity reversals of the second electric signal are applied to the coil 64 also determine the bobbin assembly reciprocation frequency.

As explained above, a DC electric voltage potential is supplied by the primary excitation and control circuit 46 to excite the primary coil 40 to produce the first magnetic field across the air gap 33. The secondary excitation and control circuit 62 may be implemented as a pulse generator, square wave generator or any other well known circuit that provides a variable frequency voltage signal that changes between a positive and negative voltage polarity and has a controllable variable magnitude. Alternately, a seires of positive polarity voltage pulses can be applied to the coil 64 to move the bobbin in one direction and a series of negative polarity voltage pulses can be applied to the coil 64 to move the bobbin in the opposite direction.

The bobbin assembly 48 upper support plate 50 is arranged with a central opening 68 in registry with the axial bore 16 in core 14 and a snap or retaining ring 70 mounted in the opening 68 axially holds a pumping tube 72 which extends therethrough for a predetermined distance above and below the plate 50. The portion of the pumping tube 72 extending below the plate 50 extends into the axial bore 16 of the core 14 and has sufficient length so that a portion of the tube 72 remains in the bore 16 when the bobbin assembly 48 travels to its maximum displacement in a direction away from the enlarged portion 18.

A cylindrical upper section designated generally at 74 has a wall 76 which is held in engagement with the shell 30 by fasteners 78,78. The upper section 74 includes an outer plate 80 attached to the wall 76 and is arranged with a threaded central opening 82 substantially in registry with the opening 68 through which the pumping tube 72 passes. An upper tube 84 has one end threaded and is screwed into the opening 82.

The portion of the pumping tube 72 above the support plate 50 extends a sufficient length into the upper tube 84 so that a portion of the tube 72 remains in the tube 84 when the bobbin assembly 48 is at a maximum displacement in a direction away from the upper plate 80.

Shock absorbing bumpers 86,86 are positioned on the upper surface 88 of the enlarged portion 18 and on the lower surface 90 of the outer plate 80 and serve as mechanical stops and energy absorbers for the bobbin assembly 48 in those instances where its travel range is exceeded prior to reversing direction as it shuttles back and forth in the travel area between the lower surface 90 and the upper surface 88 due to the successive polarity reversals of the voltage signal potential applied to the secondary coil 64.

Gaskets or seals 92,92 located near the upper and lower portions of the pumping tube 72 form a seal between the inner wall 94 of the outer tube 84 and the pumping tube 72 upper portion and the inner wall 22 of the enlarged portion 18 and the core 14 and the lower portion of the pumping tube 72, respectively.

A number of check or one-way directional flow valves are shown in FIG. 1 and are used to create separate fluid chambers within the central core fluid pump of the linear motor 10. A lower tube 96 is shown in FIG. 1 screwed into an inner threaded portion of the core 14 and includes a one-way directional flow valve 98 which is arranged for fluid flow in the direction of arrow 100. Another one-way directional pumping valve 102, arranged for fluid flow in the direction of arrow 100 is connected inside and moves with the pumping tube 72. A third one-way directional flow valve 104 is located in the upper tube 84 and is also arranged for fluid flow in the direction of arrow 100.

The central core fluid pump operates as follows. When the bobbin assembly 48 and pumping tube 72 attached thereto are caused to move in a direction toward the upper plate 80 in response to the interaction of the magnetic fields in the air gap 32, suction is created in the chamber in the bore 16 between the pumping valve 102 and the lower one-way valve 98 and a volume of fluid is drawn into and trapped in the chamber between valves 98 and 102. The end of its stroke and the direction of travel of the bobbin assembly 48 is reversed when the polarity of the voltage signal applied to the coil 64 is reversed. As the bobbin assembly 48 moves toward the enlarged portion 18, the one-way valve 98 inhibits fluid flow through itself and as the chamber volume between valves 98 and 102 decreases, the trapped fluid is forced through one-way valve 102 and into the chamber formed between valves 102 and 104 of the pumping tube 72 and the upper tube 84, respectively. The bobbin assembly 48 travel direction is again reversed and its stroke in the direction of arrow 100 is stopped in response to the reversal of the polarity of the voltage signal applied to the coil 64. As the bobbin assembly 48 moves toward the plate 80, the chamber between values 102 and 104 decreases in volume and the fluid trapped in the chamber is expelled through the valve 104 and an additional segment of fluid is drawn into the chamber between the pumping valve 102 and the lower valve 98. Successive reversals of the polarity of the voltage signal applied to the coil 64 causes the continuous reciprocating movement of the bobbin assembly 48 and the action of the one-way directional flow valves 98,102 and 104, respectively results in successive volumes of fluid to be drawn into and expelled from the central core fluid pump.

The volume of fluid that can be drawn into and expelled by the pump is porportional to the length of storke and reciprocating frequency of the bobbin assembly 48 and the magnitude of the flux density in the air gap 32. Consequently, the volumetric output of the pump is controlled by regulating the stroke length and reciprocating frequency of the electromagnetic linear motor 10.

The force F created in the air gap 32, and accordingly, the force exerted by the bobbin assembly 48 is represented by the formula:

$$F = 7.07 \times 10^{-7} NIDH$$

where F is in pounds, N is the number of turns in the secondary coil 64, I is the magnitude of the current flowng in the secondary coil 64 in amperes, D is the diameter of the secondary coil 64 and H is equal to the magnitude of the magnetic flux in the air gap 32 expressed in oersted/gauss. It will be seen that increasing the DC current flowing in the primary coil 40 increases the magnitude of the magnetic flux across the air gap 32. Furthermore, it will be seen that the force F generated by the bobbin assembly 48 due to the interaction of the magnetic fields produced by the secondary coil 64 and the primary coil 40 is directly related to the number of turns and the current flowing in the secondary coil 64 when the magnetic field produced by the primary coil is held constant.

It will also be seen that the air gap 32 between the primary coil 40 of the primary magnetic field coil assembly 12 and the secondary co 1 64 of the secondary magnetic field coil assembly 48 remains constant for the travel range of the bobbin assembly. Consequently, the force developed by the electromagnetic linear motor 10 is continuous and substantially constant at all points along the travel path of the secondary bobbin assembly 48 as it shuttles back and forth.

It has been observed in one experimental working embodiment of the linear electromagnetic motor 10 and central core fluid pump that a sufficient force is developed at a stroke displacement of one to two inches and frequency of 1200 strokes per minute to pump water at a rate of five gallons per minute at a relative high pressure of 300 pounds per square inch (psi). It has also been observed in another experimental working embodiment that a substantial force is produced with an associated longer stroke of approximately six inches at a frequency of 300 strokes per minute.

Turning now to FIG. 5, the electromagnetic linear motor is shown arranged to drive a reciprocating fluid pump wherein the electromagnetic linear motor is designated generally 106 and the reciprocating pump is designated generally 110. The linear motor 106 operates similarly to the linear motor 10 illustrated in FIGS. 1 through 4 and disclosed hereinabove and like numbers refer to like parts. The linear motor 106 includes a primary magnetic field coil central core assembly generally designated 108 and which assembly includes an elongated central core 112 supported at one end by a bottom plate 24. The core 112 has a diametrically enlarged portion 114 at its unsupported end and a concentric outer shell 30 supported by the bottom plate 24. The shell 30 surrounds the core 112 and the enlarged portion 114 to form an annular air gap 32 between the inner surface 36 of the shell 30 and the outer surface 34 of the enlarged portion 114. The central core 112 has a conductor 38 wound around it to form a primary coil 40 which produces a magnetic field across the air gap 32 when an electric signal potential of the proper magnitude and polarity is applied across the ends 42,44 of the conductor 38, respectively.

The bobbin assembly 48 of the secondary magnetic field coil includes a bobbin wall 52 attached at one end to an upper support plate 116 and to a lower support plate 54 at its other end. The upper support plate 116, bobbin wall 52 and lower support plate 54 form a spool around which a conductor 56 is wound to form a secondary coil 64. The coil 64 produces a secondary magnetic field in response to an electric signal applied across the ends 58, 60, respectively of the conductor 56. The magnetic field produced by the secondary coil 64 interacts in the air gap 32 with the magnetic field produced by the primary coil 40 and when successive polarity reversals of the voltage signal are applied to the coil 64 as described hereinabove, the bobbin assembly 48 is caused to shuttle back and forth in a direction indicated by the arrow 66.

The upper support plate 116 is coupled to a piston rod 118 of the pump 110 and in the illustration of FIG. 5, the piston rod 118 is shown attached to the upper support plate 116 by a threaded screw 120 passing through an opening 122 in the plate 116 to connect the piston rod 118 to the plate.

The piston rod 118 and an associated piston 124 of the pump 110 move with a reciprocating motion as the bobbin assembly 48 shuttles back and forth along its travel path. The piston 124 moving downwardly creates suction and causes fluid to be drawn into the pump chamber 126 from a fluid source or reservoir (not shown in FIG. 5) connected to an inlet designated generally 127 by unseating an inlet ball 128 from an associated inlet orifice. Fluid trapped in the chamber 126 is expelled from an outlet designated generally at 130 when the piston 124 is driven upward by the bobbin assembly 48 causing the fluid chamber to pressurize slightly, seat the inlet ball 128 in its orifice and unseat the outlet ball 132 from its orifice to expel the fluid. The piston 124, during its downward stroke again creates suction in the chamber 126 to unseat the inlet ball 128, reseat the outlet ball 132 and draw fluid into the chamber 126 through the inlet 127. It will be seen that the continuous reciprocating motion of the bobbin assembly 48 and the piston 124 of the pump 110 connected thereto causes successive volumes of fluid to be drawn into and expelled from the pump chamber 126.

Considering now FIG. 6, a cross-sectional view of the electromagnetic linear motor arranged as a fuel injection device is shown therein and designated generally 140. The fuel injector 140 includes an inner magnetic circuit comprised of a primary magnetic field coil central core assembly designated generally 142 and an outer concentric body 144. The inner magnetic circuit core assembly 142 and body 144 are made of a magnetic material such as, for example cold rolled steel. The core assembly 142 includes an axially elongated core 145 that has an axial bore extending lengthwise through the core and designated generally 146. One end of the core assembly 142 includes a generally cylindrical, diametrically enlarged portion 148 and along with the core 145 and injector body 144 comprise the inner magnetic circuit. An annular air gap 150 is formed between the outer surface 152 of the enlarged portion 148 and the inner surface 154 of the portion of the throttle body 144 opposite the enlarged portion.

The core assembly 142 includes a conductor 156 wound around the core 145 to form a primary electromagnetic coil 158. The coil 158 produces a magnetic field across the air gap 150 in response to an electric signal potential applied across the ends 160,162 of the conductor 156.

A secondary magnetic field coil bobbin assembly generally designated 164 includes an upper support plate 166, a bobbin wall 168 and a lower support plate 170. The plate 166, wall 168 and lower support plate 170 collectively comprise a spool around which a conductor 172 is wound to form a secondary electromagnetic coil 174.

The axial length of the secondary coil 174 is longer than the axial length of the diametrically enlarged portion 148 and preferably, is at least twice as long. The electromagnetic coil 174 produces a second magnetic field in response to an electric signal potential applied across the ends 176,178 respectively of conductor 172.

The electromagnetic secondary coil 174, when excited by an electric signal produces a second magnetic field which interacts with the first magnetic field across the air gap 150 to cause the bobbin assembly 164 to move axially in a direction indicated by the arrow 180.

The bobbin assembly 164, upper support plate 164 is arranged with a central opening 182 which is in registry with the axial bore 146 and the core 145 and a snap or retaining ring 184 mounted in the opening 182 axially holds a pumping tube 186 which extends therethrough for a predetermined distance above and below the plate 166. The portion of the pumping tube 186 extending below the plate 166 extends into the axial bore 146 of the core 145 and has sufficient length so that a portion of the tube 186 remains in the bore 146 when the bobbin assembly 164 travels the maximum extent of its stroke.

An upper tube 188 is coupled to the injector body 144 and is in registry with the pumping tube 186 so that a portion of the pumping tube extends into the upper tube 188. Seals 190,190 and 192,192 located near the upper and lower portions respectively of the pumping rube 186 form a seal between the inner wall 194 of the upper tube 188 and the inner wall 196 of the core 145.

A number of one-way directional flow valves used to create separate fluid chambers within the central core to permit fuel to enter into one end 198 of the upper tube 188, flow through the central core and exit the injector orifice 200 with the fuel moving generally in the direction indicated by arrow 202.

The first one-way valve 204 is located in the upper portion of the tube 188 and is arranged for fluid flow in the direction of arrow 202. A second one-way valve 206 is also arranged for fluid flow in the direction of arrow 204 and is connected inside and moves with the pumping tube 186. A third one-way valve 208 is connected in the core 145 in the vicinity of the orifice 200 and is also arranged for fluid flow in the direction of arrow 202.

The injector 140 operates as follows. When the bobbin assembly 164 and the pumping tube 186 attached thereto are caused to move in a direction away from the upper tube 188, suction is created in the chamber between the valves 204 and 206 and a volume of fuel is drawn into the chamber between the valves 204 and 206. When the bobbin assembly 164 is caused to move back toward the upper tube 188, fuel trapped within the chamber created between valves 204 and 206 is permitted to flow through the valve 206 into the chamber between the valve 206 and 208. On the next stroke when the bobbin assembly moves away from the upper tube 188, fuel between the valves 206 and 208 is forced through the valve 208 and through the orifice 200 to eject fuel into a cylinder of internal combustion engine or any other device requiring fuel for operation. Since fuel has again been drawn into the chamber formed between valves 204 and 206 it is allowed to flow through the valve 206 into the chamber between the valve 206 and 208 when the bobbin assembly 164 is again caused to move toward the upper tube 188.

The volume of fuel that is expelled through the orifice 200 is proportional to the length of the stroke of the pumping tube 186. The operation of the injector 140 is similar to that as described above and operates as follows.

Referring now to FIG. 7, a number of fuel injectors 140,140 are illustrated somewhat schematically and shown in a typical arrangement for providing fuel to an internal combustion engine. Fuel is distributed to the injectors 140 through a fuel distribution tube arrangement 210 by a low pressure fuel pump 212, typically operating at 3-5 pounds per square inch pressure to pump fuel from a fuel tank 214 to the injectors. The use of a low pressure pump to deliver fuel from the fuel tank to the injectors provides a significant cost savings and operational advantage over conventional fuel injection systems.

Still referring to FIG. 7, an accelerator pedal shown schematically at 216 is coupled to the movable arm 218 of a rheostat or variable resistance 220. One end 222 of the rheostat is connected to the battery and the opposite end 224 is connected to the battery ground. The position of the arm 218 between the two ends 222 and 224 provides a proportional voltage pick off point to take some proportion of the battery voltage. The voltage potential at the arm 218 is coupled to the distribution point 226 of a distributor 228 via conductor 230. The distributor 228 includes a rotor 232 which is caused to rotate in a direction indicated by arrow 234 in a conventional manner well known to those skilled in the art. The roter 232 includes two contacts 236 and 238 which transfer the voltage potential present at the distribution point 226 to the distributor contacts to couple the voltage from the distribution point to the injectors 140 in the proper timed sequence.

For purposes of simplicity and ease of reference to FIG. 6, the injector 140 includes like reference numbers.

The operation of the injector in the system of FIG. 7 is as follows. When it is desired to increase the velocity or speed of the internal combustion engine such as that used in a vehicle, the accelerator pedal 216 is depressed which causes the arm 218 of the rheostat 220 move in a direction indicated by arrow 240 to select a higher voltage potential. The voltage potential is distributed to the primary coil 158 and secondary coil 174 through the rotor contacts 236 and 238 with the voltage from contact 238 being coupled through a conductor 242 to one end 160 of the primary coil 158. The other end 162 of the coil 158 is connected to electrical ground potential. The voltage present at the contact 236 is distributed to one end 178 of the secondary coil 174 via a conductor 244 coupled between the distributor and a make contact 246 of a relay 248. The other end 176 of the secondary coil 174 is coupled to ground potential to a second make contact 250 of the relay 248. When the rotor contacts 236 and 238 rotate to the position indicated in FIG. 7, full voltage from the rheostat is applied to both the primary coil 158 and the secondary coil 174 to cause the injector pumping tube 180 to move to deliver fuel with a power stroke to the orifice 200. The length of the power stroke is proportional to the voltage from the rheostat 220. As the rotor 232 continues to rotate in the direction 234 the contacts 236 and 238 move to disconnect the contact 238 from the conductor 242 and to disconnect the contact 236 from the conductor 244. The contact 238 is next coupled to the conductor 244 and the contact 236 is connected to the conductor 252 which applies voltage to the relay 248 to operate the relay and cause the make contacts 246 and 250 to break and move to transfer one end 176 of the coil 174 to contact 254 to provide voltage from the distributor to the one end 176 of the coil. The opposite end 178 of the coil 174 is transferred to a ground potential through a resistor 256 to complete the circuit. As can be seen, the voltage polarity applied to the ends 176 and 178 of the coil 174 is reversed and as explained above causes the pumping tube 186 to return to its normal starting position. Since the primary coil 158 is removed from the circuit, the resistor 256 lowers the voltage applied to the coil 174 on the return stroke because the magnetic field produced by the coil 174 need only be sufficiently large to overcome the residual magnetism in the injector body and the resistance of the one-way valve 206 moving against the fuel. In a manner similar to the operation of a normal accelerator pedal in a vehicle to increase the speed of the vehicle by controlling the amount of fuel supplied to the engine, the depression of the accelerator 216 causes the arm 218 of the rheostat 220 to select a higher voltage potential and consequently provide a higher voltage potential to the coils 158 and 172 to generate a stronger power stroke and an increased length to deliver the required additional fuel.

The distributor shown in FIG. 7 may be replaced with a microprocessor based control module similar to the control modules used for the electronic control of the internal combustion engine in the modern vehicles. The control module takes into account the engine speed, temperature coolant, altitude, the position of the operator throttle and the various emission sensors. The control module provides an output to control the fuel pump to deliver fuel to the fuel injectors. In the instant case, the microprocessor control module provides the proper magnitude of the voltage signal to excite the primary and secondary coils to eject the desire amount of fuel on the power stroke and to reverse the polarity of the voltage signal applied to the secondary coil to cause the injector to return to its normal position.

An electromagnetic linear motor having a variable length stroke and providing a substantially large force in both its power stroke and return stroke is presented above in several preferred embodiments. It will be understood that numerous changes may be made to the invention and therefore the invention has been presented by way of illustration rather than limitation.

I claim:

1. An electromagnetic linear motor having a controllable variable length stroke, said motor comprising:
    (a) a magnetic structure including an inner magnetic circuit means and an outer magnetic circuit means,
    (b) said inner magnetic circuit means including,
        i. an axially elongated cylindrical core of magnetic material supported at one end by a bottom plate and having a diametrically enlarged portion at the end opposite the supported end, said core having a conductor wound around it between said supported end and said enlarged portion to form a first electric coil means,
        said inner magnetic circuit means including a first-applied electric signal having a controllable magnitude,
        said first electric coil means producing in response to said first applied electric signal, a first magnetic field having a variable intensity, and
        ii. an outer concentric shell supported by said bottom plate and made of a magnetic material for forming an air gap between said enlarged end portion and said concentric shell to support said first field thereacross,
    (c) said outer magnetic circuit means including shuttle means coaxially arranged between said core and said outer concentric shell and extending through said air gap in an axial direction along said elongated cylindrical core, said shuttle means including a bobbin having a conductor would thereon to form a second electric coil means, said outer magnetic circuit means including a second-applied electric signal having a controllable magnitude, said second electric coil means producing in response to said second applied electric signal, a second magnetic field having a variable intensity (d) means for continuously controlling said controllable magnitude of said first-applied electric signal and and controllable magnitude of said second-applied electric signal, said shuttle means traveling between two predetermined spaced apart positions for a desired displacement along a rectilinear path in one and an opposite direction through the air gap, respectively in response to said second magnetic field interacting with said first magnetic field, said displacement by said shuttle means being directly proportional to and controllable by the magnitude of the intensity of said magnetic field whereby the stroke length of said shuttle means is controlled by said means for continuously controlling said controllable magnitudes of said first and second-applied electric signals to produce the desired displacement.

2. An electromagnetic linear motor having a controllable variable length stroke as defined in claim 1 further characterized by first DC current circuit means for producing said first-applied electric signal and by second DC current circuit means for producing said second-applied electric signal, said second electric signal having a first and second electrical polarity and a variable magnitude to produce a desired intensity second magnetic field, said second magnetic field having a first direction produced by and corresponding to one of said first and second electrical polarities and a second direction produced by and corresponding to the other of said first and second electrical polarities, said second electrical signal being applied alternately in one and the other of said first and second polarities and at a given fixed magnitude to cause said shuttle means to move a desired displacement corresponding to said given fixed magnitude of said second electric signal in one direction and the opposite direction, respectively.

3. An electromagnetic linear motor having a controllable variable length stroke as defined in claim 1 further characterized by the axial length of said second electric coil being longer than the axial length of said enlarged end portion so that the magnetic field intensity produced across said air gap by the interaction of said first and second magnetic fields is of a substantially constant magnitude as said shuttle means continuously moves along said rectilinear path through said air gap whereby the force exerted by said shuttle means is substantially constant throughout said shuttle means travel movement.

4. An electromagnetic linear motor having a controllable variable length stroke as defined in claim 3 further characterized in that the axial length of said second electric coil is at least twice the axial length of said enlarged end portion.

5. Apparatus as defined in claim 2 wherein the frequency of said shuttle means reciprocating motion corresponds to the rate at which said second electrical signal is applied alternately in said one and the other of said first and second polarities.

6. An electromagnetic linear motor as defined in claim 2 further comprising:

said cylindrical core having an axial bore extending therethrough and forming a first tube and being supported at one end by a bottom plate having an opening therethrough in registry with said first tube;

said bobbin including a support plate having a central opening therethrough substantially in registry with said first tube, said shuttle means displacement along said path being directly proportional to and controllable by the magnitude of the intensity of said second magnetic field whereby the stroke length of said shuttle means is controlled to produce the desired displacement;

a second tube having two ends and an axial bore therethrough, said second tube fixedly mounted in the central opening of the support plate for movement with the plate and shuttle means and extending for some distance on opposite sides of the plate, one end of said second tube moving coaxially within said first tube;

a third tube, fixedly connected to the inner magnetic circuit concentric shell in coaxial alignment with said first and second tubes and receiving the other end of said second tube, said second tube moving coaxially within said third tube, and sealing means located substantially near each of said one and other end of said second tube for forming a seal between said second tube outer wall and said first tube inner wall at said second tube one end and for forming a seal between said second tube outer wall and said third tube inner wall at said second tube other end, and each of said first, second and third tubes having check valve means for forming a first variable volume chamber in said first and second tubes and a second variable volume chamber in said second and third tubes so as to cause successive volumes of fluid to be drawn into said first chamber and discharged from said second chamber when said shuttle means moves in one direction and to draw fluid from said first chamber into said second chamber when said shuttle means moves in the opposite direction whereby continuous reciprocating motion of said shuttle means causes successive volumes of fluid to be drawn into and expelled from said apparatus.

7. Apparatus as defined in claim 6 wherein said second applied electric signal is applied with one of said first and second electric polarities and at a given fixed magnitude for a perdetermined time interval causing said shuttle means to move a predetermined desired displacement in one direction expelling a given volume of fluid from said apparatus, said given volume of fluid being related to the change in volume of said second variable volume chamber corresponding to the displacement of said shuttle means.

8. Apparatus as defined in claim 7 wherein said second applied electric signal is applied with the other of said first and second electric polarities and at a given fixed magnitude for a predetermined time interval causing said shuttle means to move said predetermined displacement in the other direction opposite said one direction so as to cause said given volume of fluid to be drawn from said first variable volume chamber and transferred into said second variable volume chamber.

9. An electromagnetic linear motor having a controllable variable length stroke as defined in claim 2 wherein the frequency at which said shuttle means reciprocates corresponds to the rate at which said second electrical signal is applied alternately in said one and the other of said first and second polarities.

10. In combination with a reciprocating fluid pump having inlet and outlet means, a fluid chamber and a pumping piston in the chamber connected to a piston rod with an electromagnetic linear motor having a variable stroke connected thereto, said electromagnetic motor comprising:

(a) a magnetic structure including an inner magnetic circuit means and an outer magnetic circuit means, (b) said inner magnetic circuit including,    i. an axially elongated cylindrical core of magnetic material supported at one end by a bottom plate and having a diametrically enlarged portion at the end opposite the supported end, said core having a conductor wound around it between said supported end and said enlarged portion to form a first electric coil means, said inner magnetic circuit means including a first applied electric signal having a controllable magnitude, said first electric coil means producing in response to said first applied electric signal, a first magnetic field having a variable intensity, and    ii. an outer concentric shell supported by said bottom plate and made of a magnetic material for forming an air gap between said enlarged end portion and said concentric shell to support said first magnetic field thereacross, (c) said outer magnetic circuit including shuttle means connected with said piston rod and coaxially arranged between said core and said outer concentric shell and extending through said air gap in a axial direction along said elongated cylindrical core, said shuttle means including a bobbin having a conductor wound threon to form a second electrical coil means, said outer magnetic circuit means including a second-applied electric signal having a controllable magnitude, said second electric coil means producing in response to said second applied electric signal, a second magnetic field having a variable intensity, (d) means for continuously controlling said controllable magnitude of said first-applied electric signal and said controllable magnitude of said second-applied electric signal, said shuttle means having means for coupling said shuttle means to said piston rod to drive said pump with a reciprocating motion as said shuttle means moves in a rectilinear path in one and an opposite direction through the air gap, respectively in response to said magnetic field interacting with said first magnetic field, whereby said means for continuously controlling said controllable magnitude of said first-applied electric signal and said controllable magnitude of said second-applied electric signal variably and resultingly controls the magnetic field interaction between said first and second magnetic fields to vary the stroke of the pumping piston.

* * * * *